US009645627B2

(12) United States Patent
Lin et al.

(10) Patent No.: US 9,645,627 B2
(45) Date of Patent: May 9, 2017

(54) COMPUTER STICK DOCKING SYSTEM AND POWER MANAGEMENT METHOD THEREOF

(71) Applicant: Quanta Computer Inc., Taoyuan (TW)

(72) Inventors: Hsin-Liang Lin, Taoyuan (TW); Yi-Ting Hu, Taoyuan (TW); Yu-Lin Hsieh, Taoyuan (TW); Chen-Ming Chen, Taoyuan (TW); Chia-Jung Fan, Taoyuan (TW); Hsin-Yi Cheng, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 104 days.

(21) Appl. No.: 14/695,358

(22) Filed: Apr. 24, 2015

(65) Prior Publication Data
US 2016/0202748 A1 Jul. 14, 2016

(30) Foreign Application Priority Data

Jan. 13, 2015 (TW) .............................. 104101040 A

(51) Int. Cl.
*G06F 1/32* (2006.01)
*G06F 1/30* (2006.01)

(52) U.S. Cl.
CPC .............. *G06F 1/30* (2013.01); *G06F 1/3234* (2013.01)

(58) Field of Classification Search
None
See application file for complete search history.

(56) References Cited

U.S. PATENT DOCUMENTS

| 5,930,517 A * | 7/1999 | Diehl .................... G06F 1/1628 710/304 |
| 2005/0138740 A1* | 6/2005 | Alfano ................. A46B 13/008 15/22.1 |
| 2009/0212738 A1* | 8/2009 | Coonan ................. H02J 7/0027 320/113 |
| 2010/0295960 A1* | 11/2010 | Furlan ................ H01R 13/6683 348/222.1 |
| 2013/0205060 A1* | 8/2013 | Benhard ............... H02J 7/0027 710/303 |
| 2014/0327833 A1* | 11/2014 | Kabuto ................... G06F 1/266 348/730 |
| 2015/0026515 A1* | 1/2015 | Arnouse ............. G06F 11/2023 714/10 |

(Continued)

*Primary Examiner* — Kim Huynh
*Assistant Examiner* — Danny Chan
(74) *Attorney, Agent, or Firm* — McClure, Qualey & Rodack, LLP

(57) ABSTRACT

A computer stick docking system and a power management method thereof are provided. The computer stick docking system includes a docking station and a computer stick device. The docking station is configured to receive a display device and a computer stick device, including a docking battery and a docking HDMI interface circuit. The computer stick device includes a computer-stick controller and a computer-stick HDMI interface circuit. The computer-stick controller is configured to load an operating system. The computer-stick HDMI interface circuit, coupled to the computer-stick controller, is configured to request battery power information of the docking battery from the docking station after it is powered on and the computer-stick HDMI interface circuit is connected to the docking station.

8 Claims, 6 Drawing Sheets

(56) References Cited

U.S. PATENT DOCUMENTS

2016/0126757 A1* 5/2016 Hirosawa .............. G06F 1/1632
307/20
2016/0182291 A1* 6/2016 Verma ................. H04L 41/0813
709/221

* cited by examiner

| pin | signal configuration | pin | signal configuration |
|---|---|---|---|
| 1 | TMDS Data2+ | 2 | GND |
| 3 | TMDS Data2- | 4 | TMDS Data1+ |
| 5 | GND | 6 | TMDS Data1- |
| 7 | TMDS Data0+ | 8 | GND |
| 9 | TMDS Data0- | 10 | Clock+ |
| 11 | GND | 12 | Clock- |
| 13 | BAT_SCL | 14 | BAT_SDA |
| 15 | SCL | 16 | SDA |
| 17 | GND | 18 | +5V |
| 19 | HPD | | |

FIG. 3B

COMPUTER STICK DOCKING SYSTEM AND POWER MANAGEMENT METHOD THEREOF

CROSS REFERENCE TO RELATED APPLICATIONS

This Application claims priority of Taiwan Patent Application No. 104101040, filed on Jan. 13, 2015, the entirety of which is incorporated by reference herein.

BACKGROUND

Field

The present disclosure relates to a micro-computer platform, and in particular, to a computer sticks docking system and a power management method thereof.

Description of the Related Art

A computer stick is a micro-computer platform. A tablet computer may be produced by combining a computer stick with a docking station. Normally, the battery of the docking station may supply power to the computer stick. Because the computer stick only possesses standard HDMI and USB interfaces, an operating system on the computer stick may not obtain the battery status of the docking station via the two interfaces. Therefore, an abnormal shutdown will result if the battery power is about to be exhausted and the operating system on the computer stick has no way to identify the condition.

A computer stick docking system and a power management method thereof is needed to allow the computer stick to identify the battery status of the docking station to prevent an abnormal shutdown.

BRIEF SUMMARY OF THE DISCLOSURE

A detailed description is given in the following embodiments with reference to the accompanying drawings.

An embodiment of a computer stick docking system is disclosed, including a docking station and a computer stick device. The docking station is configured to receive a display device and a computer stick device, comprising a docking battery and a docking HDMI interface circuit. The computer stick device includes a computer-stick controller and a computer-stick HDMI interface circuit. The computer-stick controller is configured to load an operating system. The computer-stick HDMI interface circuit, coupled to the computer-stick controller, is configured to request battery power in the docking battery from the docking station after it is powered on and the computer-stick HDMI interface circuit is connected to the docking station.

Another embodiment of a power management method is provided, adopted by a computer stick docking system which comprises a docking station and a computer stick device, wherein the docking station comprises a docking battery and a docking HDMI interface circuit, and the computer stick device comprises a computer-stick controller and a computer-stick HDMI interface circuit. The power management method includes: after the computer stick device powers on, loading, by the computer-stick controller, an operating system; and after it is powered on and the computer-stick HDMI interface circuit is connected to the docking station, requesting, by the computer-stick HDMI interface circuit, battery power from the docking battery from the docking station.

BRIEF DESCRIPTION OF THE DRAWINGS

The present disclosure can be more fully understood by reading the subsequent detailed description and examples with references made to the accompanying drawings, wherein:

FIGS. 3A and 3B show pins of the computer-stick HDMI interface circuit 102 and the docking HDMI interface circuit 124 and corresponding signals.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Various embodiments described herein are in connection to a power-saving mode, which may be also referred to as a sleep mode, a hibernation mode, an idle mode, a standby mode, or a lower-power mode.

Figure 1:
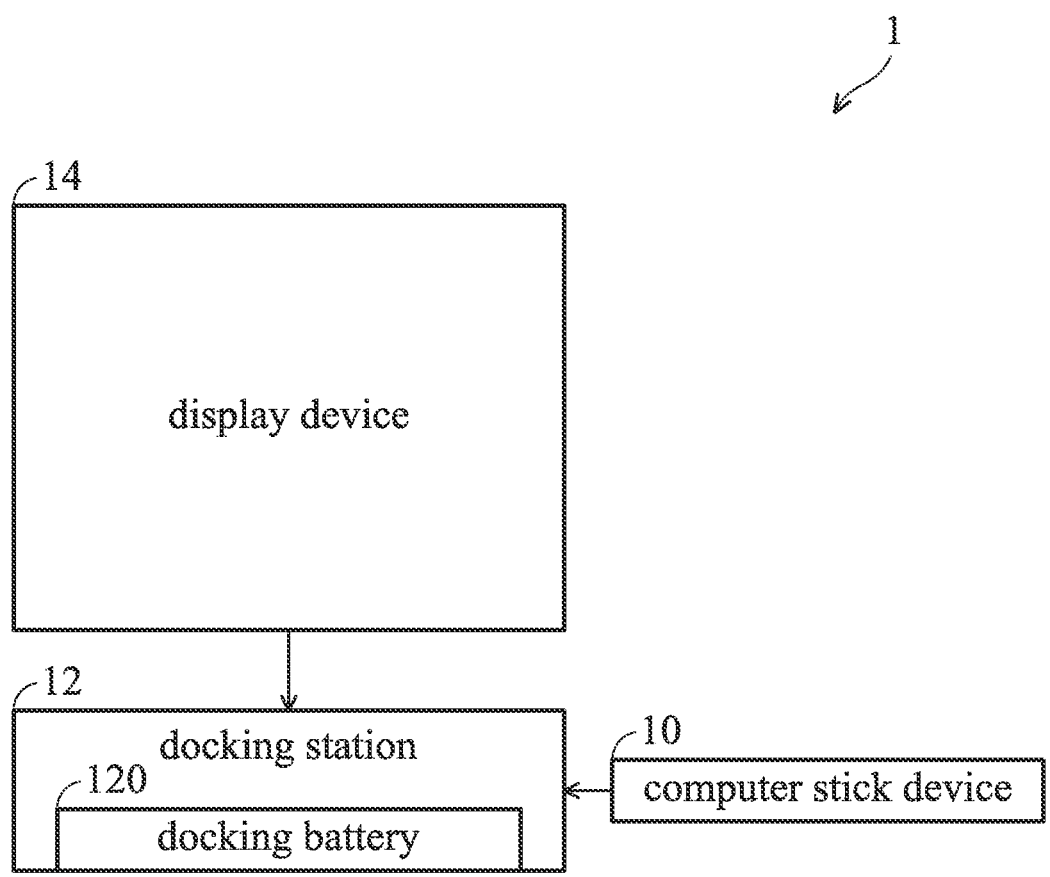
FIG. 1 is a schematic diagram of a computer stick docking system 1 according to an embodiment of the invention.

FIG. 1 is a schematic diagram of a computer stick docking system 1 according to an embodiment of the invention, including a computer stick device 10 and a docking station 12. The computer stick device 10 is a micro-computer, which turns a television or a panel display into a computer when being inserted into the television or the panel display. The docking station 12 may accept the display device 14 and the computer stick device 10, connecting the computer stick device 10 to the display device 14. The display device 14 may be an image-display device such as a panel television, a panel display, or a tablet computer. The docking station 12 includes a docking battery 120 which supplies power to the docking station 12, the computer stick device 10 and the display device 14.

The computer stick device 10 only supports the Input/Output (10) interfaces of the High Definition Multimedia Interface (HDMI), a Universal Serial Bus (USB) interface, and a DC-in jack. The computer stick device 10 obtains power via the DC-in jack. When the computer stick device 10 is inserted into the docking station 12, power may be acquired from the docking battery 120 of the docking station 12 via the DC-in jack. When the computer stick device 10 obtains power from the docking battery 120, the optional pins of the HDMI interface are used to establish a communication interface between the computer stick device 10 and the docking station 12, reporting a battery status of the docking battery 120 to an operation system running on the computer stick device 10, thereby preventing an abnormal shutdown due to insufficient power of the docking battery 120.

Figure 2:
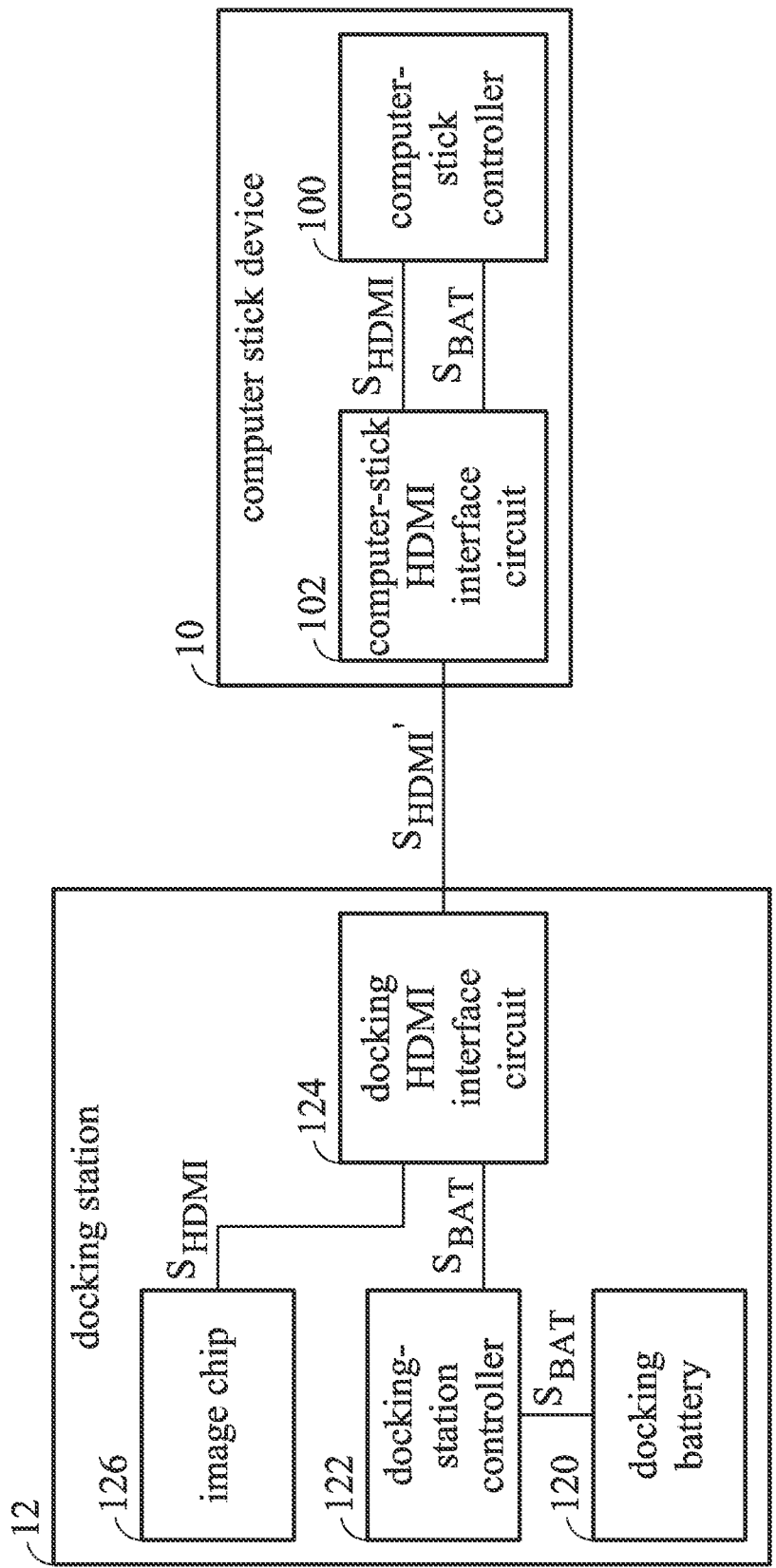
FIG. 2 is a block diagram of the computer stick docking system 1 in FIG. 1.

FIG. 2 is a block diagram of the computer stick docking system 1 in FIG. 1, wherein the computer stick device 10 includes a computer-stick controller 100 and a computer-stick HDMI interface circuit 102, and the docking station 12 includes a docking battery 120, a docking-station controller 122, a docking HDMI interface circuit 124 and an image chip 126.

Figure 3A:
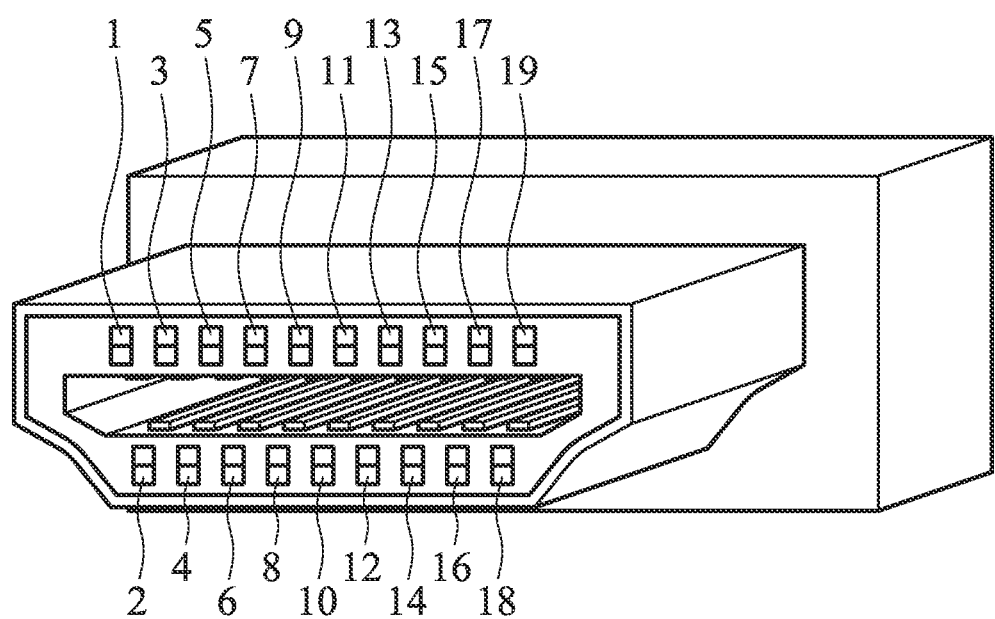

The computer stick device 10 and the docking station 12 may be connected to each other by a direct connection of the computer-stick HDMI interface circuit 102 and the docking HDMI interface circuit 124 or connecting via a HDMI connection cable, and communicate to each other via HDMI signals. Please refer to FIGS. 3A and 3B for pins of the computer-stick HDMI interface circuit 102 and the docking HDMI interface circuit 124 and corresponding signals, wherein Pin 13 and Pin 14 are known as CEC and Utility Pins in the HDMI specification, and both are optional. In the embodiment, HDMI interface Pin 13 and Pin 14 are defined as a BAT_SCL pin and a BAT_SDA pin, respectively, for transmitting a BAT_SCL signal and a BAT_SDA signal, respectively, by I2C or System Management Bus (SMBus). The BAT_SCL signal may be a serial clock signal, and the BAT_SDA signal may be a serial data signal. Please refer to FIG. 3: The computer stick device 10 and the docking station 12 request and report the battery status of the docking battery 120 of the docking station 12 via the BAT_SCL pin and the BAT_SDA pin of the computer-stick HDMI interface circuit 102 and the docking HDMI interface circuit 124. Specifically, once the computer stick device 10 is inserted into the docking station 12 and powers on, the computer stick device 10 may request the battery power information of the docking battery 120 via the BAT_SCL pin and the BAT_SDA pin of the computer-stick HDMI interface circuit 102. In response to the request for the battery power information of the docking battery 120, the docking station 12 may report the battery power information of the docking battery 120 via the BAT_SCL pin and the BAT_SDA pin of the docking HDMI interface circuit 124.

Turning back to FIG. 2, the docking station 12 may also include a power switch (not shown). When the power switch is opened, the computer stick docking system 1 will be turned off; whereas when the power switch is closed, the docking station 12 may be turned on firstly and check whether the power of the docking battery 120 is too low. If the power of the docking battery 120 is too low, the docking station 12 may be turned off directly. If the power of the docking battery 120 is not too low and the computer stick device 10 is connected to the docking station 12, the computer stick device 10 may be triggered to be turned on. After the computer stick device 10 powers on, it will load an operating system, and determine the battery status of the docking battery 120 regularly or during power up. In particular, the computer stick device 10 may determine whether the battery power is sufficient for the power supply. The computer stick device 10 may determine the battery status of the docking battery 120 via the HDMI interface.

The computer-stick controller 100 of the computer stick device 10 transmits a HDMI interface signal $S_{HDMI}$ and battery power management signal $S_{BAT}$ to the docking station 12 via the computer-stick HDMI interface circuit 102. The computer-stick HDMI interface circuit 102 combines the HDMI interface signal $S_{HDMI}$ and battery power management signal $S_{BAT}$ together to provide a HDMI interface signal $S_{HDMI}'$ for transmission to the docking HDMI interface circuit 124 of the docking station 12. In the docking station 12, the image chip 126 receives and processes the HDMI interface signal $S_{HDMI}$ from the docking HDMI interface circuit 124 to be displayed on the inserted display device. Concurrently, the docking-station controller 122 receives the battery power management signal $S_{BAT}$ via the docking HDMI interface circuit 124, reads the battery status of the docking battery 120 according to the battery power management signal $S_{BAT}$, and reports the battery status of the docking battery 120 in a form of I²C or SMBus to the computer stick device 10 via the docking HDMI interface circuit 124. The battery power management signal $S_{BAT}$ is transmitted between the computer-stick HDMI interface circuit 102 and the docking HDMI interface circuit 124 by the I²C or SMBus via the BAT_SDA pin of the HDMI interface circuit, and includes a request message requesting the battery status of the docking battery 120 and a report message reporting the battery status of the docking battery 120. The battery status of the docking battery 120 includes the battery power information of the docking battery 120.

After receiving the battery power information of the docking battery 120 reported from the docking station 12, the operating system on the computer-stick controller 100 may determine an operational power mode according to the battery status of the docking battery 120. For example, when the battery power information of the docking battery 120 is less than a safe power threshold, the operating system on the computer-stick controller 100 may enter a power-saving mode, thereby preventing the battery 120 from running down and causing an abnormal shutdown of the computer stick device 10. On the contrary, when the battery power information of the docking battery 120 exceeds the safe power threshold, the operating system on the computer-stick controller 100 may be run in a normal operation mode.

Figure 4A:
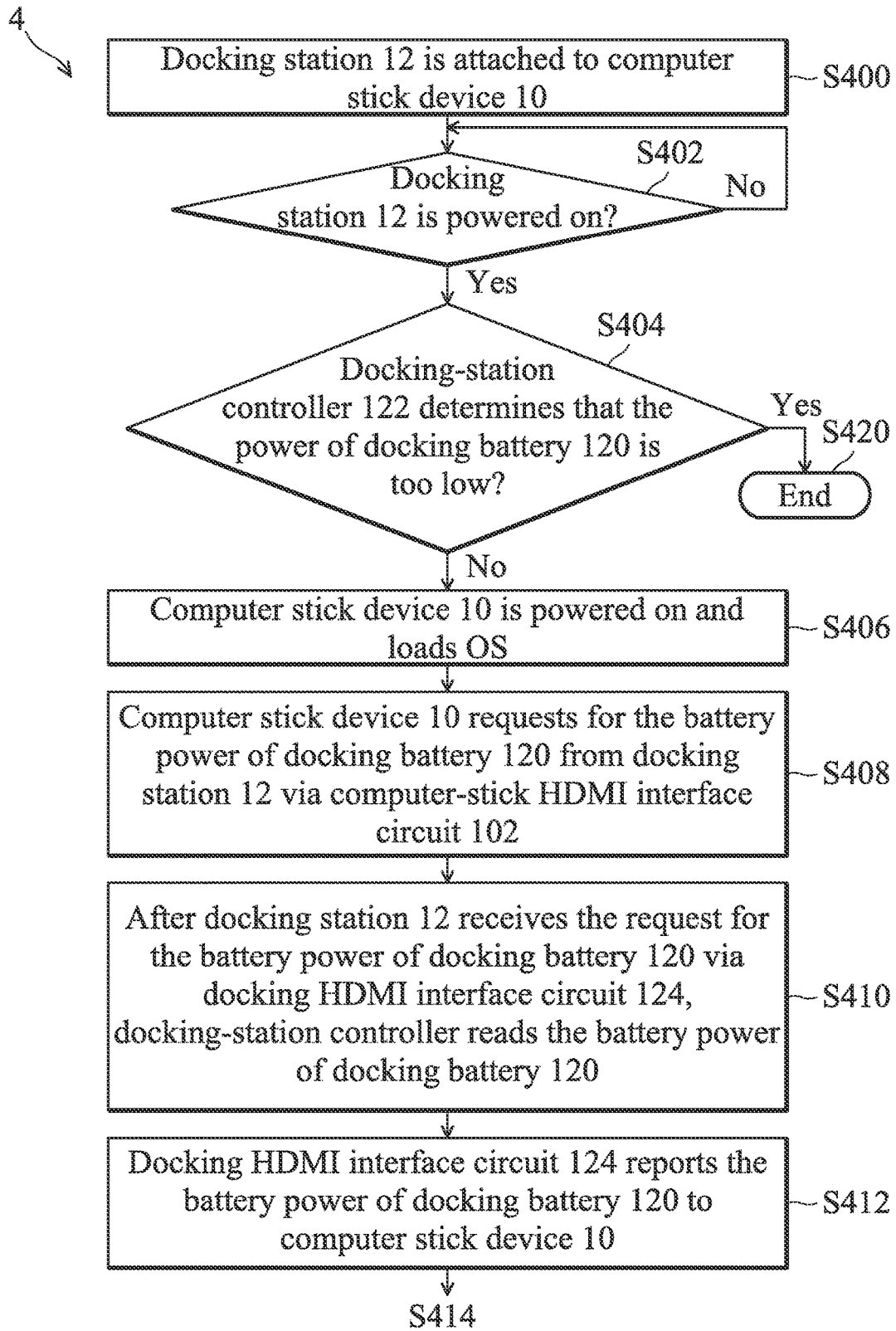
FIGS. 4A and 4B are flowcharts of a power management method 4 according to an embodiment of the invention.
Figure 4B:
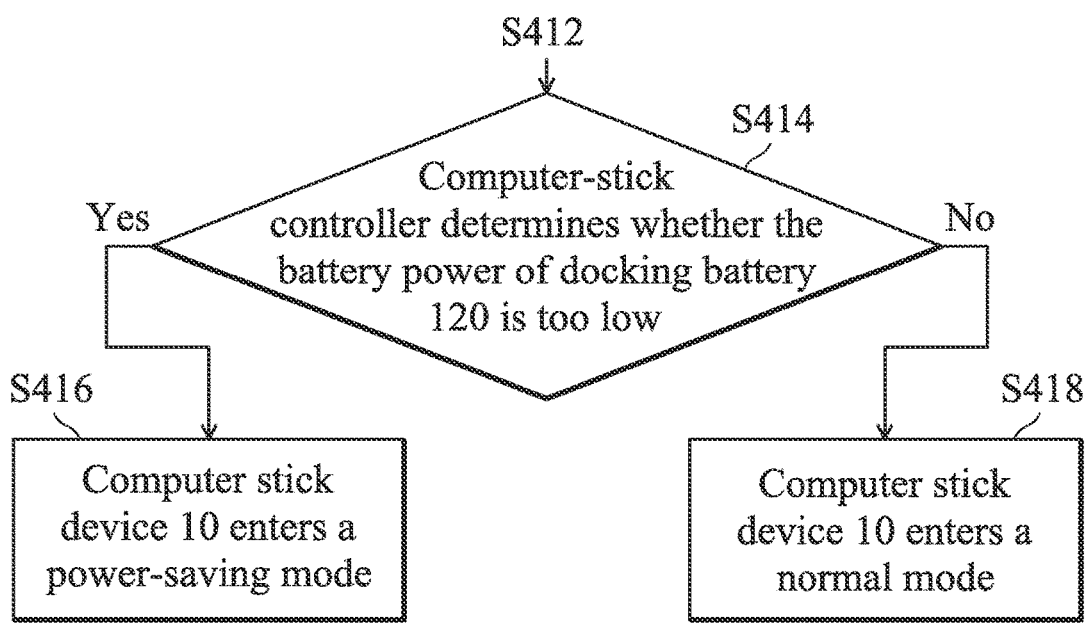

FIGS. 4A and 4B are flowcharts of a power management method 4 according to an embodiment of the invention, incorporating the computer stick docking system 1 in FIGS. 1 and 2.

Upon startup of the power management method 4, the computer stick device 10 is inserted into the docking station 12, and is connected to the docking station 12 via an HDMI interface (S400). Next, the docking-station controller 122 determines whether the docking station 12 is powered-on according to the power switch status (S402). When the power switch is opened, the docking station may be turned off, whereas when power switch is closed, the docking station 12 may be turned on firstly and check whether the power of the docking battery 120 is too low (S404). If the power of the docking battery 120 is too low, the docking station 12 may be turned off directly (S420). If the power of the docking battery 120 exceeds or is equal to a predetermined power threshold, the docking station 12 may turn on the computer stick device 10 via the HDMI interface.

Upon power up, the computer stick device 10 may load the operating system (S406), and request the battery power information of the docking battery 120 from the docking station 12 via the computer-stick HDMI interface circuit 102 (S408). Specifically, the computer-stick controller 100 may transmit the battery power management signal $S_{BAT}$ via the computer-stick HDMI interface circuit 102 to request the battery power information of the docking battery 120.

In response to the received battery power management signal $S_{BAT}$, the docking-station controller 122 of the docking station 12 may read the battery power information of the docking battery 120 by the I²C or SMBus communication protocol (S410), and report the battery power information of the docking battery 120 to the computer stick device 10 via the docking HDMI interface circuit 124 (S412). In particular, the docking-station controller 122 may transmit the battery power management signal $S_{BAT}$ via docking HDMI interface circuit 124 to report the battery power information of the docking battery 120.

After receiving the battery power information of the docking battery 120, the computer-stick controller 100 may determine whether the power of the docking battery 120 is too low (S414). The computer-stick controller 100 may compare the reported battery power information of the docking battery 120 to the safe power threshold. When the battery power information of the docking battery 120 is less than the safe power threshold, the operating system on the computer-stick controller 100 may enter the power-saving mode (S416), thereby preventing an abnormal shutdown; whereas when the battery power information of the docking battery 120 exceeds the safe power threshold, the operating system on the computer-stick controller 100 may be run in the normal operation mode (S418).

The embodiments in FIGS. 1 through 4A, 4B provide a computer stick docking system and a power management method thereof, which allow a computer stick to acquire the battery status of a docking station via an HDMI interface, thereby managing operations of an operating system running on the computer stick, and preventing an abnormal shutdown.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer stick docking system, comprising:
a docking station, configured to receive a display device and a computer stick device, comprising a docking battery and a docking HDMI interface circuit; and
the computer stick device, comprising:
a computer-stick controller, configured to load an operating system; and
a computer-stick HDMI interface circuit, coupled to the computer-stick controller, configured to request battery power information of the docking battery from the docking station after the computer stick device is powered on and the computer-stick HDMI interface circuit is connected to the docking station;
wherein after the computer stick device is powered on and the computer-stick HDMI interface circuit is connected to the docking station, the computer-stick HDMI interface circuit is configured to request the battery power information of the docking battery from the docking station the via a CEC pin and a Utility pin, and wherein the CEC pin transmits or receives a serial clock signal and wherein the utility pin transmits or receives a serial data signal for requesting battery information or for receiving a battery power information report.

2. The computer stick docking system of claim 1, wherein the computer-stick HDMI interface circuit is configured to ask the docking station for the battery power information of the docking battery by an I2C bus or a System Management Bus (SMBus) via the CEC pin and the Utility pin.

3. The computer stick docking system of claim 1, wherein in response to the request for the battery power information of the docking battery, the docking HDMI interface circuit is configured to report the battery power information of the docking battery to the computer stick device.

4. The computer stick docking system of claim 3, wherein after receiving the battery power information of the docking battery, the computer-stick controller is configured to determine an operation mode of the operating system based on the battery power information of the docking battery, and when the battery power information of the docking battery is less than a predefined value, the computer-stick controller is configured to determine that the operation mode of the operating system is a power-saving mode.

5. The computer stick docking system of claim 1, wherein the docking station further comprises a docking-station controller, coupled to the docking battery and the docking HDMI interface circuit, configured to read the battery power information of the docking battery after the docking HDMI interface circuit receives the request for the battery power information of the docking battery.

6. A power management method, adopted by a computer stick docking system which comprises a docking station and a computer stick device, wherein the docking station comprises a docking battery and a docking HDMI interface circuit, and the computer stick device comprises a computer-stick controller and a computer-stick HDMI interface circuit, the power management method comprising:
after the computer stick device powers on, loading, by the computer-stick controller, an operating system; and
after the computer stick device is powered on and the computer-stick HDMI interface circuit is connected to the docking station, requesting, by the computer-stick HDMI interface circuit, battery power information of the docking battery from the docking station,
wherein after the computer stick device is powered on and the computer-stick HDMI interface circuit is connected to the docking station, the computer-stick HDMI interface circuit is configured to ask the docking station for the battery power information of the docking battery by an I2C bus or a System Management Bus (SMBus) via the CEC in and the Utility pin, and wherein the CEC in transmits or receives a serial clock signal and wherein the utility in transmits or receives a serial data signal for requesting battery information or for receiving a battery power information report.

7. The power management method of claim 6, further comprising:
in response to the request for battery power information of the docking battery, reporting, by the docking HDMI interface circuit, the battery power information of the docking battery to the computer stick device;
after receiving the battery power information of the docking battery, determining, by the computer-stick controller, an operation mode of the operating system based on the battery power information of the docking battery;

wherein the step of determining the operation mode of the operation system comprises: when the battery power information of the docking battery is less than a predefined value, determining, by the computer-stick controller, that the operation mode of the operating system is a power-saving mode.

8. The power management method of claim 6, wherein the docking station further comprises a docking-station controller, coupled to the docking battery and the docking HDMI interface circuit, and the power management method further comprises: reading, by the docking-station controller, the battery power information of the docking battery after the docking HDMI interface circuit receives the request for the battery power information of the docking battery.

* * * * *